United States Patent
Kinoe et al.

(10) Patent No.: US 12,227,899 B2
(45) Date of Patent: Feb. 18, 2025

(54) METHOD FOR PRODUCING PRINTED TEXTILE ITEM

(71) Applicant: RISO KAGAKU CORPORATION, Tokyo (JP)

(72) Inventors: Kokoro Kinoe, Ibaraki (JP); Akiko Hayashi, Ibaraki (JP); Tetsuya Shiraishi, Ibaraki (JP); Takeshi Koyama, Ibaraki (JP); Shinsuke Ozawa, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 170 days.

(21) Appl. No.: 18/059,875

(22) Filed: Nov. 29, 2022

(65) Prior Publication Data
US 2023/0203750 A1    Jun. 29, 2023

(30) Foreign Application Priority Data

Dec. 27, 2021 (JP) .................................. 2021-212732

(51) Int. Cl.
| | |
|---|---|
| *D06P 5/30* | (2006.01) |
| *B41J 2/21* | (2006.01) |
| *C09D 11/08* | (2006.01) |
| *C09D 11/322* | (2014.01) |
| *C09D 11/54* | (2014.01) |
| *D06P 1/54* | (2006.01) |

(52) U.S. Cl.
CPC .............. *D06P 5/30* (2013.01); *B41J 2/2117* (2013.01); *C09D 11/08* (2013.01); *C09D 11/322* (2013.01); *C09D 11/54* (2013.01); *D06P 1/54* (2013.01)

(58) Field of Classification Search
CPC ..................................................... C09D 11/54
See application file for complete search history.

(56) References Cited

U.S. PATENT DOCUMENTS

| | | | |
|---|---|---|---|
| 9,951,468 B2 | 4/2018 | Arai et al. | |
| 2016/0194824 A1 | 7/2016 | Ohashi et al. | |
| 2017/0314194 A1* | 11/2017 | Arai ...................... | D06P 1/5257 |
| 2017/0355866 A1 | 12/2017 | Ellis et al. | |
| 2018/0030301 A1 | 2/2018 | Yamazaki et al. | |
| 2018/0237647 A1 | 8/2018 | Yamada | |
| 2020/0317942 A1 | 10/2020 | Yamada | |
| 2021/0070082 A1* | 3/2021 | Guo ...................... | B41M 5/0011 |

FOREIGN PATENT DOCUMENTS

| | | |
|---|---|---|
| CN | 111417689 | 7/2020 |
| JP | 2018024853 | 2/2018 |
| JP | 2018-131581 | 8/2018 |
| JP | 2019-099790 | 6/2019 |
| JP | 2020138439 | 9/2020 |
| WO | 2020090212 | 5/2020 |
| WO | 2021/055700 | 3/2021 |

OTHER PUBLICATIONS

The extended European Search Report issued for European Patent Application No. 22210896.1, Apr. 17, 2023, 9 pages.
Chinese first Office Action issued in CN Application No. 202211672430.9, issued Oct. 18, 2024, 21 pages, English machine translation.other than search results portion.

* cited by examiner

*Primary Examiner* — Shelby L Fidler
(74) *Attorney, Agent, or Firm* — HSML P.C.

(57) ABSTRACT

A method for producing a printed textile item, the method including applying a treatment liquid containing an aggregating agent to a fabric using an inkjet method, applying a white ink having a charge density of at least 30 μeq/g, using a step of using an inkjet method and a wet-on-wet method, to the fabric to which the treatment liquid has been applied, applying a color ink for which the Young's modulus of the dried coating film is not more than 3.0 MPa, using an inkjet method and a wet-on-wet method, to the fabric to which the white ink has been applied.

7 Claims, No Drawings

METHOD FOR PRODUCING PRINTED TEXTILE ITEM

CROSS REFERENCE TO RELATED APPLICATIONS

This application is based upon and claims the benefit of priority from the prior Japanese Patent Application No. 2021-212732, filed on Dec. 27, 2021, the entire contents of which are incorporated by reference herein.

BACKGROUND OF THE INVENTION

Field of the Invention

Embodiments of the present invention relate to a method for producing a printed textile item.

Description of the Related Art

Among the various methods for printing images such as text, pictures or designs onto fabrics such as woven fabrics, knitted fabrics and nonwoven fabrics, in addition to screen textile printing methods and roller textile printing methods, inkjet textile printing methods are now attracting considerable attention.

Printed textile items require favorable fastness properties.

JP 2019-99790 A discloses a textile printing method that yields a printed textile item having excellent rubbing fastness using an ink composition and a coating composition for which the Young's modulus of the dried coating film is higher than that of the dried coating film of the ink composition.

JP 2018-131581 A discloses that by adding a crosslinking agent to an inkjet textile printing composition, the obtained printed items tend to exhibit improved rubbing fastness.

When printing using an inkjet textile printing method with a dark colored fabric or the like as a substrate, one method that is used for improving the color development of color inks is a method in which, for example, a white ink is first printed onto the substrate, and the color ink is then printed on top of the white ink.

SUMMARY OF THE INVENTION

One embodiment of the present invention relates to a method for producing a printed textile item, the method including applying a treatment liquid containing an aggregating agent to a fabric using an inkjet method, applying a white ink having a charge density of at least 30 μeq/g, using an inkjet method and a wet-on-wet method, to the fabric to which the treatment liquid has been applied, and apply a color ink for which the Young's modulus of the dried coating film is not more than 3.0 MPa, using an inkjet method and a wet-on-wet method, to the fabric to which the white ink has been applied.

DETAILED DESCRIPTION OF THE EMBODIMENTS

Embodiments of the present invention are described below in detail, but needless to say, the present invention is not limited to these embodiments, and various modifications and alterations are possible.

A method for producing a printed textile item according to one embodiment includes a applying a treatment liquid containing an aggregating agent to a fabric using an inkjet method, applying a white ink having a charge density of at least 30 μeq/g, using an inkjet method and a wet-on-wet method, to the fabric to which the treatment liquid has been applied, and a applying a color ink for which the Young's modulus of the dried coating film is not more than 3.0 MPa, using an inkjet method and a wet-on-wet method, to the fabric to which the white ink has been applied.

When using this method for producing a printed textile, a printed textile item can be provided which may exhibit excellent concealment properties due to the white ink, and is capable of reducing cracking of the ink image following laundering. Although not constrained by any particular theory, the reasons for these effects are thought to include the following.

When a white ink and a color ink are respectively applied using a wet-on-wet method to a fabric to which a treatment liquid has been applied, because drying steps are not generally required following the treatment liquid application and the white ink application, the productivity can be improved. On the other hand, in some cases the concealment properties of the white ink may deteriorate, and cracking of the ink image following laundering may sometimes occur more readily.

However, in those cases where the charge density of the white ink is at least 30 μeq/g, the white ink tends to react more readily with the treatment liquid, and as a result, penetration of the white ink into the interior of the fabric can be more easily suppressed, meaning the concealment properties can be improved.

Further, in order to enhance the concealment properties provided by the white ink, it is preferable that the white ink contains a component that reacts readily with the aggregating agent of the treatment liquid, but in those cases where the white ink contains such a component, the coating film of the white ink can sometimes become non-uniform, and the resulting printed textile item may sometimes become prone to cracking of the ink image following laundering. When a color ink for which the Young's modulus of the dried coating film is not more than 3.0 MPa is applied on top of the white ink layer, the ink coating film of the ink image can be more easily made more flexible. Further, in those cases where the charge density of the white ink is at least 30 μeq/g, because the white ink and the aggregating agent are able to react satisfactorily, the aggregating agent and the color ink applied after the application of the white ink are less likely to react, meaning any deterioration in the flexibility of the color ink coating film may be suppressed. It is thought that, as a result of these effects, cracking of the ink image following laundering can be reduced.

In the case of a wet-on-wet method, the white ink and the color ink may mix together, and the image density of the color ink may sometimes fall. By using this method for producing a printed textile item, any reduction in the image density of the color ink may be suppressed. Although not constrained by any particular theory, it is thought that one possible reason for this effect is that when the charge density of the white ink is at least 30 μeq/g, the components in the white ink (for example, a pigment, a resin and/or the like) react comparatively quickly with the aggregating agent of the treatment liquid and undergo aggregation, causing the viscosity of the ink to increase, and making mixing with the color ink less likely.

The fabric, treatment liquid, white ink and color ink are described below.

<Fabric>

Examples of the fabric include fabrics containing natural fibers such as cotton, silk, wool and linen; chemical fibers such as polyester, acrylic, polyurethane, nylon, rayon, cupra and acetate; or mixtures of these fibers. Further, the fabric may be a woven fabric, a knitted fabric, or a nonwoven fabric or the like.

<Treatment Liquid>

The treatment liquid may contain an aggregating agent.

Components which have an action of aggregating the colorant within the ink on top of the fabric that represents the substrate may be used as the aggregating agent. Metal salts, cationic polymers, organic acids, or combinations of these substances may be used as the aggregating agent. Polyvalent metal salts are preferred as the metal salts.

The amount of the aggregating agent (the amount of the active component), relative to the total mass of the treatment liquid, is preferably at least 1% by mass, more preferably at least 10% by mass, and even more preferably 15% by mass or greater. The amount of the aggregating agent (the amount of the active component), relative to the total mass of the treatment liquid, is preferably not more than 50% by mass, more preferably not more than 45% by mass, and even more preferably 40% by mass or less. The amount of the aggregating agent (the amount of the active component), relative to the total mass of the treatment liquid, is preferably within a range from 1 to 50% by mass, more preferably from 10 to 45% by mass, and even more preferably from 15 to 40% by mass. In those cases where two or more aggregating agents are used, the above amount of the aggregating agent refers to the total amount of all the aggregating agents.

Polyvalent metal salts can be used favorably as the metal salts.

Polyvalent metal salts are composed of a divalent or higher polyvalent metal ion and an anion. Examples of the divalent or higher polyvalent metal ion include $Ca^{2+}$, $Mg^{2+}$, $Cu^{2+}$, $Ni^{2+}$, $Zn^{2+}$, and $Ba^{2+}$. Examples of the anion include $Cl^-$, $NO_3^-$, $CH_3COO^-$, $I^-$, $Br^-$, and $ClO_3^-$. Specific examples of the polyvalent metal salts include calcium chloride, calcium nitrate, magnesium nitrate, copper nitrate, calcium acetate, and magnesium acetate.

A single metal salt may be used alone, or a combination of two or more metal salts may be used.

The amount of the metal salt (the amount of the active component), relative to the total mass of the treatment liquid, is preferably at least 5% by mass, more preferably at least 10% by mass, and even more preferably 15% by mass or greater. On the other hand, the amount of the metal salt (the amount of the active component), relative to the total mass of the treatment liquid, is preferably not more than 50% by mass, more preferably not more than 45% by mass, and even more preferably 40% by mass or less. The amount of the metal salt (the amount of the active component), relative to the total mass of the treatment liquid, is preferably within a range from 5 to 50% by mass, more preferably from 10 to 45% by mass, and even more preferably from 15 to 40% by mass. In those cases where two or more metal salts are used, the above amount of the metal salt refers to the total amount of all the metal salts.

In those cases where a metal salt hydrate is used as the polyvalent metal salt, the amount of the polyvalent metal salt (the amount of the active component) refers to the equivalent amount of the anhydrous salt.

Cationic water-soluble resins are preferred as the cationic polymers.

Examples of the cationic water-soluble resins include polyethyleneimine (PEI), polyvinylamine, polyallylamine and salts thereof, polyvinylpyridine, and copolymers of cationic acrylamide. More specifically, for example, resins such as polydiallyldimethylammonium chloride may be used.

Examples of commercially available products of cationic water-soluble resins include the SHALLOL series of products such as SHALLOL DC-303P and SHALLOL DC-902P manufactured by DKS Co. Ltd., the UNISENCE series such as UNISENCE FCA1000L and UNISENCE FPA100L manufactured by SENKA Corporation, and the H.C. Polymer series such as H.C. Polymer 1S, H.C. Polymer 1N, H.C. Polymer 1NS, H.C. Polymer 2 and H.C. Polymer 2L manufactured by Osaka Organic Chemical Industry Ltd. (wherein all of the above are product names).

Further, examples of commercially available products of polyethyleneimines include the EPOMIN series of products such as EPOMIN SP-006, EPOMIN SP-012, EPOMIN SP-018 and EPOMIN SP-200 manufactured by NIPPON SHOKUBAI Co., Ltd., and the products Lupasol FG, Lupasol G20 Waterfree and Lupasol PR 8515 manufactured by BASF Japan Ltd. (wherein all of the above are product names).

Furthermore, examples of commercially available products of polyallylamines include the allylamine polymers PAA-01, PAA-03 and PAA-05, the allylamine hydrochloride polymers PAA-HCL-01, PAA-HCL-03 and PAA-HCL-5, and the allylamine amide sulfate polymers such as PAA-SA, all manufactured by Nittobo Medical Co., Ltd. (wherein all of the above are product names).

A single cationic polymer may be used alone, or a combination of two or more cationic polymers may be used.

The amount (solid fraction) of the cationic polymer, relative to the total mass of the treatment liquid, is preferably within a range from 5 to 50% by mass, more preferably from 10 to 45% by mass, and even more preferably from 15 to 40% by mass. In those cases where two or more cationic polymers are used, the above amount of the cationic polymer refers to the total amount of all the cationic polymers.

Examples of the organic acids include formic acid, acetic acid, propionic acid, butyric acid, isobutyric acid, valeric acid, isovaleric acid, oxalic acid, malonic acid, succinic acid, glutaric acid, maleic acid, fumaric acid, citraconic acid, itaconic acid, tricarballylic acid, glycolic acid, thioglycolic acid, lactic acid, malic acid, tartaric acid, citric acid, isocitric acid, gluconic acid, pyruvic acid, oxalacetic acid, diglycolic acid, benzoic acid, phthalic acid, mandelic acid and salicylic acid. Among these, acetic acid is preferred.

A single organic acid may be used alone, or a combination of two or more organic acids may be used.

The amount of the organic acid, relative to the total mass of the treatment liquid, is preferably within a range from 5 to 50% by mass, more preferably from 10 to 45% by mass, and even more preferably from 15 to 40% by mass. In those cases where two or more organic acids are used, the above amount of the organic acid refers to the total amount of all the organic acids.

The treatment liquid preferably contains water as an aqueous solvent.

There are no particular limitations on the water used, and examples include ion-exchanged water, distilled water and ultrapure water.

The amount of water relative to the total mass of the treatment liquid is preferably within a range from 30 to 90% by mass, more preferably from 40 to 85% by mass, and even more preferably from 50 to 80% by mass.

The treatment liquid preferably contains a water-soluble organic solvent.

Organic compounds that are liquid at room temperature and can be dissolved in water can be used as the water-soluble organic solvent, and the use of a water-soluble organic solvent that mixes uniformly with an equal volume of water at 1 atmosphere and 20° C. is preferred. Examples of organic solvents that may be used include lower alcohols such as methanol, ethanol, 1-propanol, isopropanol, 1-butanol, 2-butanol, isobutanol and 2-methyl-2-propanol; glycols such as ethylene glycol, diethylene glycol, triethylene glycol, tetraethylene glycol, polyethylene glycol, propylene glycol, dipropylene glycol, tripropylene glycol and polypropylene glycol; glycerols such as glycerol, diglycerol, triglycerol and polyglycerol; acetins such as monoacetin and diacetin; glycol ethers such as ethylene glycol monomethyl ether, ethylene glycol monoethyl ether, ethylene glycol monopropyl ether, ethylene glycol monobutyl ether, diethylene glycol monomethyl ether, diethylene glycol monoethyl ether, diethylene glycol monopropyl ether, diethylene glycol monobutyl ether, triethylene glycol monomethyl ether, triethylene glycol monoethyl ether, triethylene glycol monopropyl ether, triethylene glycol monobutyl ether, tetraethylene glycol monomethyl ether, tetraethylene glycol monoethyl ether, tetraethylene glycol dimethyl ether and tetraethylene glycol diethyl ether; as well as triethanolamine, 1-methyl-2-pyrrolidone, 1,3-dimethyl-2-imidazolidinone, β-thiodiglycol and sulfolane. The boiling point of the water-soluble organic solvent is preferably at least 100° C., and more preferably 150° C. or higher.

One of these water-soluble organic solvents may be used alone, or a combination of two or more water-soluble organic solvents may be used provided the solvents form a single phase with water. The amount of the water-soluble solvent, relative to the total mass of the treatment liquid, is preferably within a range from 5 to 50% by mass, more preferably from 10 to 40% by mass, and even more preferably from 15 to 30% by mass. In those cases where two or more water-soluble organic solvents are used, the above amount of the water-soluble organic solvent refers to the total amount of all the water-soluble organic solvents.

The treatment liquid preferably contains a surfactant. Examples of surfactants that may be used include anionic surfactants, cationic surfactants, amphoteric surfactants and nonionic surfactants, but nonionic surfactants are particularly preferred. The surfactant maybe, for example, a low-molecular weight surfactant or a polymer-based surfactant.

The HLB value of the surfactant is preferably within a range from 5 to 20, and more preferably from 10 to 18.

Examples of the nonionic surfactants include ester-based surfactants such as glycerol fatty acid esters and fatty acid sorbitan esters; ether-based surfactants such as polyoxyethylene alkyl ethers, polyoxyethylene alkylphenyl ethers and polyoxypropylene alkyl ethers; ether ester-based surfactants such as polyoxyethylene sorbitan fatty acid esters; acetylene-based surfactants; silicone-based surfactants; and fluorine-based surfactants. Among these, acetylene-based surfactants such as acetylene glycol-based surfactants can be used particularly favorably.

Examples of the acetylene-based surfactants include acetylene glycol-based surfactants, acetylene alcohol-based surfactants, and surfactants having an acetylene group.

Acetylene glycol-based surfactants are glycols having an acetylene group, are preferably glycols having a left-right symmetrical structure with an acetylene group in the center, and may include a structure in which ethylene oxide has been added to acetylene glycol.

Examples of commercially available products of acetylene-based surfactants include the SURFYNOL series of products such as SURFYNOL 104E, SURFYNOL 104H, SURFYNOL 420, SURFYNOL 440, SURFYNOL 465 and SURFYNOL 485 manufactured by Evonik Industries AG, and the OLFINE series of products such as OLFINE E1004, OLFINE E1010 and OLFINE E1020 manufactured by Nissin Chemical Industry Co., Ltd. (wherein all of the above are product names).

Examples of the silicone-based surfactants include polyether-modified silicone-based surfactants, alkyl-aralkyl-comodified silicone-based surfactants, and acrylic silicone-based surfactants.

Examples of commercially available products of silicone-based surfactants include SILFACE SAG002 and SILFACE SAG503A manufactured by Nissin Chemical Industry Co., Ltd. (wherein both of the above are product names).

Further examples of other nonionic surfactants include polyoxyethylene alkyl ether-based surfactants such as the EMULGEN series of products including EMULGEN 103, EMULGEN 104P, EMULGEN 105, EMULGEN 106, EMULGEN 108, EMULGEN 120, EMULGEN 147, EMULGEN 150, EMULGEN 220, EMULGEN 350, EMULGEN 404, EMULGEN 420, EMULGEN 705, EMULGEN 707, EMULGEN 709, EMULGEN 1108, EMULGEN 4085 and EMULGEN 2025G manufactured by Kao Corporation (wherein all of the above are product names).

Examples of the anionic surfactants include the EMAL series of products such as EMAL 0, EMAL 10, EMAL 2F, EMAL 40 and EMAL 20C, the NEOPELEX series of products such as NEOPELEX GS, NEOPELEX G-15, NEOPELEX G-25 and NEOPELEX G-65, the PELEX series of products such as PELEX OT-P, PELEX TR, PELEX CS, PELEX TA, PELEX SS-L and PELEX SS-H, and the DEMOL series of products such as DEMOL N, DEMOL NL, DEMOL RN and DEMOL MS, all manufactured by Kao Corporation (wherein all of the above are product names).

Examples of the cationic surfactants include the ACETAMIN series of products such as ACETAMIN 24 and ACETAMIN 86, the QUARTAMIN series of products such as QUARTAMIN 24P, QUARTAMIN 86P, QUARTAMIN 60W and QUARTAMIN 86W, and the SANISOL series of products such as SANISOL C and SANISOL B-50, all manufactured by Kao Corporation (wherein all of the above are product names).

Examples of the amphoteric surfactants include the AMPHITOL series of products such as AMPHITOL 20BS, AMPHITOL 24B, AMPHITOL 86B, AMPHITOL 20Y-B and AMPHITOL 20N manufactured by Kao Corporation (wherein all of the above are product names).

One of the above surfactants is preferably used alone, but a combination of two or more surfactants may also be used.

The amount of the surfactant, relative to the total mass of the treatment liquid, is preferably within a range from 0.1 to 10% by mass, more preferably from 0.2 to 5% by mass, and even more preferably from 0.4 to 2% by mass. In those cases where two or more surfactants are used, the above amount of the surfactant refers to the total amount of all the surfactants.

The treatment liquid may, if necessary, also contain one or more of other components such as antifoaming agents, pH adjusters, antioxidants, and preservatives and the like.

There are no particular limitations on the method used for producing the treatment liquid, and production may be performed using appropriate conventional methods. For example, the treatment liquid may be obtained by using a stirring device such as a three-one motor to disperse all of the components, either in a single batch or in a number of separate batches, and then passing the dispersion through a filtration device such as a membrane filter if desired.

The charge density of the treatment liquid is preferably within a range from 1 to 400 μeq/g, and more preferably from 10 to 300 μeq/g. Here, the charge density refers to the charge density measured in accordance with the flow potential method. The charge density of the treatment liquid is the amount of charge per mass unit of the active component in the treatment liquid (units: μeq/g). The amount of the active component is the total mass of the non-volatile fraction or solid fraction contained in the treatment liquid, and is mainly the amount obtained upon removal of the solvent from the treatment liquid. Specifically, the total amount of charge can be determined by diluting the treatment liquid 100-fold with water, titrating this dilute treatment liquid with a 0.0025 N potassium polyvinyl sulfate (PVSK) solution and measuring the reaction end point where the flow potential of the dilute treatment liquid reaches 0 V, and then determining the total amount of charge for the dilute treatment liquid from the amount of the PVSK solution used in reaching this reaction end point. The value obtained by dividing this total amount of charge for the dilute treatment liquid by the amount of the active component contained in the dilute treatment liquid is the treatment liquid charge density (μeq/g). For example, a colloid particle charge meter (such as "Model CAS" manufactured by AFG Analytic GmbH) or the like can be used as the charge density measurement device.

<White Ink>

A white ink with a charge density of at least 30 μeq/g can be used as the white ink.

Here, the charge density refers to the charge density measured in accordance with the flow potential method. The charge density of the ink is the amount of charge per mass unit of the active component in the ink (units: μeq/g). The amount of the active component is the total mass of the non-volatile fraction or solid fraction contained in the ink, and is mainly the amount obtained upon removal of the solvent from the ink. For example, in those cases where materials such as a pigment dispersion, a dispersant, and a resin emulsion of a water-dispersible resin are used, and one or more of these materials contain a solvent, then the amount of the active component is determined by removing the amount of the solvent from these materials.

Specifically, the total amount of charge can be determined by diluting the ink 100-fold with water, titrating this dilute ink with a 0.0025 N poly(diallyldimethylammonium chloride) (polyDADMAC) solution and measuring the reaction end point where the flow potential of the dilute ink reaches 0 V, and then determining the total amount of charge for the dilute ink from the amount of the polyDADMAC solution used in reaching this reaction end point. The value obtained by dividing this total amount of charge for the dilute ink by the amount of the active component contained in the dilute ink is the ink charge density (μeq/g).

For example, a colloid particle charge meter (such as "Model CAS" manufactured by AFG Analytic GmbH) or the like can be used as the charge density measurement device.

The charge density of the white ink is preferably at least 30 μeq/g, more preferably at least 35 μeq/g, and even more preferably 40 μeq/g or greater. On the other hand, the charge density of the white ink is preferably not more than 150 μeq/g, and more preferably 120 μeq/g or less. The charge density of the white ink is, for example, preferably within a range from 30 to 150 μeq/g, more preferably from 35 to 150 μeq/g, and even more preferably from 40 to 120 μeq/g.

Adjustment of the charge density of the white ink can be achieved by appropriate selection of the components contained within the white ink. For example, the ink charge density can be adjusted by altering the amount of counter ions for the ionic groups of the materials included in the ink. This amount of counter ions indicates the amount of ions per particle mass. Generally, the larger the amount of counter ions per particle mass, the higher the charge density tends to become. For example, the charge density is preferably adjusted using the amount of counter ions in the pigment and the water-dispersible resin within the ink. Further, the charge density of the ink may also be adjusted, for example, by adding an ionic component such as a dispersion assistant to the ink. The charge density of the ink may also be adjusted using a combination of two or more methods.

The white ink preferably contains, for example, a colorant and a resin. Examples of the resin include the polymer dispersants and water-dispersible resins and the like described below.

The white ink preferably contains a white pigment as a colorant.

Examples of the white pigment include inorganic pigments such as titanium oxide, zinc oxide, zinc sulfide, antimony oxide and zirconium oxide. Examples of the white pigment further include hollow resin microparticles and polymer microparticles. Among the various possibilities, from the viewpoint of the concealment properties, the use of titanium oxide is preferred. The average particle size of the titanium oxide is preferably at least 50 nm from the viewpoint of the concealment properties, and is preferably not more than 500 nm from the viewpoint of the jetting stability. In those cases where titanium oxide is used, in order to suppress any photocatalytic action, the use of titanium oxide that has been surface treated with alumina or silica is preferred. The amount of surface treatment preferably represents 5 to 20% by mass of the pigment.

The pigment may include the type of self-dispersing pigment described below.

Further, a pigment dispersion containing a pigment that has already been dispersed using a pigment dispersant may also be used. Pigment dispersions that have been dispersed using the pigment dispersants described below may be used.

A single colorant may be used, or a combination of two or more colorants may be used.

From the viewpoint of the concealment properties, the amount of the colorant relative to the total mass of the white ink is preferably within a range from 1 to 30% by mass, more preferably from 3 to 20% by mass, and even more preferably from 5 to 15% by mass. In those cases where two or more colorants are used, the above amount of the colorant refers to the total amount of all the colorants.

In those cases where a pigment is used as the colorant in the white ink, a pigment dispersant typified by polymer dispersants and surfactant-type dispersants and the like may be used to ensure stable dispersion of the pigment in the white ink.

Examples of commercially available products of the polymer dispersants include the TEGO Dispers series of products such as TEGO Dispers 740W, TEGO Dispers 750W, TEGO Dispers 755W, TEGO Dispers 757W and TEGO Dispers 760W manufactured by Evonik Industries AG, the Solsperse series of products such as Solsperse 20000, Solsperse 27000, Solsperse 41000, Solsperse 41090, Solsperse 43000, Solsperse 44000 and Solsperse 46000 manufactured by The Lubrizol Corporation, the Joncryl series of products such as Joncryl 57, Joncryl 60, Joncryl 62, Joncryl 63, Joncryl 71 and Joncryl 501 manufactured by BASF Japan Ltd., as well as DISPERBYK-102, DISPERBYK-185, DISPERBYK-190, DISPERBYK-193 and DISPERBYK-199 manufactured by BYK-Chemie Japan K.K., and Polyvinylpyrrolidone K-30 and Polyvinylpyrrolidone K-90 manufactured by DKS Co. Ltd. (wherein all of the above are product names).

Examples of the surfactant-type dispersants include anionic surfactants, including the DEMOL series of products such as DEMOL P, DEMOL EP, DEMOL N, DEMOL RN, DEMOL NL, DEMOL RN-L and DEMOL T-45 manufactured by Kao Corporation, and nonionic surfactants including the EMULGEN series of products such as EMULGEN A-60, EMULGEN A-90, EMULGEN A-500, EMULGEN B-40, EMULGEN L-40 and EMULGEN 420 manufactured by Kao Corporation (wherein all of the above are product names).

One of the above pigment dispersants may be used, or a combination of two or more pigment dispersants may be used.

When used, there are no particular limitations on the blend amount of the pigment dispersant in the ink, which varies depending on the type of pigment dispersant used, but generally, the amount of the pigment dispersant, expressed as a mass ratio of the active component relative to a value of 1 for the pigment (the pigment concentration), is preferably within a range from 0.005 to 0.5.

The white ink preferably contains water as an aqueous solvent, and the main solvent may be water.

There are no particular limitations on the water, but water containing as few ionic components as possible is preferred. In particular, from the viewpoint of the ink storage stability, the amount of polyvalent metal ions such as calcium ions is preferably kept low. Examples of the water include ion-exchanged water, distilled water and ultrapure water.

From the viewpoint of adjustment of the ink viscosity, the amount of water relative to the total mass of the white ink is preferably within a range from 30 to 90% by mass, more preferably from 40 to 85% by mass, and even more preferably from 50 to 80% by mass.

The white ink may also contain a water-soluble organic solvent.

Organic compounds that are liquid at room temperature and can be dissolved in water can be used as the water-soluble organic solvent, and the use of a water-soluble organic solvent that mixes uniformly with an equal volume of water at 1 atmosphere and 20° C. is preferred.

Examples of the water-soluble organic solvents that may be used include those described above in relation to the treatment liquid, and the water-soluble organic solvent may be selected from among those described above in relation to the treatment liquid.

One of these water-soluble organic solvents may be used alone, or a combination of two or more water-soluble organic solvents may be used provided the solvents form a single phase with water.

The amount of the water-soluble organic solvent, relative to the total mass of the white ink, is preferably within a range from 1 to 50% by mass, more preferably from 5 to 40% by mass, and even more preferably from 10 to 30% by mass. In those cases where two or more water-soluble organic solvents are used, the above amount of the water-soluble organic solvent refers to the total amount of all the water-soluble organic solvents.

The white ink preferably contains a surfactant.

Examples of surfactants that may be used include anionic surfactants, cationic surfactants, amphoteric surfactants and nonionic surfactants, but nonionic surfactants are particularly preferred. The surfactant may be, for example, a low-molecular weight surfactant or a polymer-based surfactant.

The HLB value of the surfactant is preferably within a range from 5 to 20, and more preferably from 10 to 18.

Examples of the surfactants that may be used include surfactants described above in relation to the treatment liquid, and the surfactant may be selected from among those described above in relation to the treatment liquid.

Among these, acetylene-based surfactants such as acetylene glycol-based surfactants can be used particularly favorably.

A single surfactant may be used, or a combination of two or more surfactants may be used.

The amount of the surfactant, relative to the total mass of the white ink, is preferably within a range from 0.1 to 5% by mass, and more preferably from 0.2 to 2% by mass. In those cases where two or more surfactants are used, the above amount of the surfactant refers to the total amount of all the surfactants.

The white ink may also contain a water-dispersible resin.

When a water-dispersible resin is included, a favorable reaction between the aggregating agent of the treatment liquid and the white ink may be more easily obtained, and favorable concealment properties may be more easily achieved for the white ink.

The water-dispersible resin is preferably composed of resin particles that can be dispersed in an aqueous solvent. The water-dispersible resin may, for example, be blended into the ink in the form of an oil-in-water resin emulsion.

The water-dispersible resin may be a self-emulsifying resin having an introduced hydrophilic component that enables stable dispersion in water, or may be a resin having self-dispersibility through use of a separate emulsifier.

From the viewpoint of the inkjet jetting characteristics, the average particle size of the water-dispersible resin is preferably not more than 300 nm, more preferably not more than 200 nm, and even more preferably 150 nm or less. For example, the average particle size of the water-dispersible resin may be within a range from 10 nm to 300 nm. Here, the average particle size of the water-dispersible resin refers to the volume-based average particle size, and is a numerical value measured by a light scattering method.

In terms of the type of water-dispersible resin used, the use of a resin that forms a transparent coating film is preferred.

Examples of the water-dispersible resin include conjugated diene-based resins such as styrene-butadiene copolymers, methyl methacrylate-butadiene copolymers, and vinyl chloride-vinyl acetate copolymers; acrylic-based resins such as acrylate ester polymers and methacrylate ester polymers, and copolymers of these compounds with styrene or the like; vinyl-based resins such as ethylene-vinyl acetate copolymers, or functional group-modified resins in which a carboxyl group or the like of any of these resins has been modified with a functional group-containing monomer; as well as melamine resins, urea resins, polyurethane resins, unsaturated polyester resins, polyolefin resins, silicone resins, polyvinyl butyral resins, and alkyd resins. Resin emulsions containing one of these resins may be used, but hybrid resin emulsions may also be used.

The water-dispersible resin may be anionic, cationic, nonionic, or amphoteric. An anionic water-dispersible resin is preferred as the water-dispersible resin.

The anionic water-dispersible resin may be a resin in which the anionic groups of the resin are located at the particle surface, as is the case with self-emulsifying resins, or may be a resin that has been subjected to a surface treatment by, for example, adhering an anionic dispersant to the resin particle surfaces. Representative examples of the anionic groups include carboxyl groups, sulfo groups, and phosphate groups. The anionic dispersant may, for example, be an anionic surfactant or the like.

The white ink preferably contains a water-dispersible resin A and a water-dispersible resin B with mutually different charge densities. In those cases where, among the water-dispersible resin A and the water-dispersible resin B, the resin having the lower charge density is deemed the water-dispersible resin A, and the resin having the higher charge density is deemed the water-dispersible resin B, it is thought that after the water-dispersible resin B having the higher charge density has formed a coating film, the water-dispersible resin A having the lower charge density forms a coating film that fills the irregularities in the coating film of the water-dispersible resin B, and that as a result, cracking of the ink image following laundering can be further reduced.

The charge density of the water-dispersible resin A is preferably not more than 60 µeq/g, more preferably not more than 55 µeq/g, and even more preferably 50 µeq/g or lower. The charge density of the water-dispersible resin B is preferably at least 65 µeq/g, more preferably at least 70 µeq/g, and even more preferably 75 µeq/g or higher. In one embodiment, the white ink preferably contains a water-dispersible resin A having a charge density of not more than 60 µeq/g, not more than 55 µeq/g, or not more than 50 µeq/g, and a water-dispersible resin B having a charge density of at least 65 µeq/g, at least 70 µeq/g, or at least 75 µeq/g. For example, the white ink preferably contains a water-dispersible resin A having a charge density of 55 µeq/g or lower, and a water-dispersible resin B having a charge density of 75 µeq/g or higher.

There are no particular limitations on either of the water-dispersible resin A and the water-dispersible resin B, and each may be selected independently from among the resins described above. The water-dispersible resin A and the water-dispersible resin B are preferably both anionic water-dispersible resins.

The mass ratio between the amounts (solid fractions) of the water-dispersible resin A and the water-dispersible resin B (water-dispersible resin A:water-dispersible resin B) is preferably within a range from 2:1 to 2:3.

Here, the charge density of the water-dispersible resin refers to the charge density measured in accordance with the flow potential method. The charge density of the water-dispersible resin is the amount of charge per mass unit of the active component of the water-dispersible resin (units: µeq/g). Specifically, the total amount of charge can be determined by diluting a resin emulsion of the water-dispersible resin with sufficient water to achieve a solid fraction of 0.05% by mass, thus preparing a dilute liquid, titrating this dilute liquid with a 0.0025 N poly(diallyldimethylammonium chloride) (polyDADMAC) solution and measuring the reaction end point where the flow potential of the dilute liquid reaches 0 V, and then determining the total amount of charge for the dilute liquid from the amount of the polyDADMAC solution used in reaching this reaction end point. The value obtained by dividing this total amount of charge for the dilute liquid by the solid fraction contained in the dilute liquid is the charge density of the water-dispersible resin (µeq/g).

For example, a colloid particle charge meter (such as "Model CAS" manufactured by AFG Analytic GmbH) or the like can be used as the charge density measurement device.

Examples of commercially available products of water-dispersible resins include SUPERFLEX 460 manufactured by DKS Co., Ltd., UW-1005D-C1 and UW-1527DF manufactured by UBE Corporation, DAOTAN TW6490/35WA, DAOTAN TW6460/35WA and DAOTAN TW6490/30WA manufactured by DaicelAllnex Ltd., NeoRez R986 manufactured by Covestro AG, Mowinyl 6763 manufactured by Japan Coating Resin Corporation, and ADEKA BONTIGHTER HUX-370 manufactured by ADEKA Corporation (wherein all of the above are product names).

One of these water-dispersible resins may be used alone, or a combination of two or more water-dispersible resins may be used. The amount (solid fraction) of the water-dispersible resin, relative to the total mass of the white ink, is preferably at least 1% by mass, more preferably at least 3% by mass, and even more preferably 5% by mass or greater. The amount (solid fraction) of the water-dispersible resin, relative to the total mass of the white ink, is preferably not more than 30% by mass, and more preferably 20% by mass or less. The amount (solid fraction) of the water-dispersible resin, relative to the total mass of the white ink, is preferably within a range from 1 to 30% by mass, more preferably from 3 to 30% by mass, and even more preferably from 5 to 20% by mass. In those cases where two or more water-dispersible resins are used, the above amount of the water-dispersible resin refers to the total amount of all the water-dispersible resins.

The amount (solid fraction) of the water-dispersible resin in the white ink, expressed as a mass ratio relative to a value of 1 for the amount of the pigment in the white ink, is preferably within a range from 0.1 to 10, and more preferably from 1 to 5. In those cases where two or more water-dispersible resins are used, this amount of the water-dispersible resin refers to the total amount of all the water-dispersible resins. This also applies to the above amount of the pigment.

The white ink may also contain one or more of other components if necessary. Examples of these other components include pH adjusters and preservatives.

There are no particular limitations on the method used for producing the white ink, and production may be performed using appropriate conventional methods. For example, the white ink may be obtained by using a stirring device such as a three-one motor to disperse all of the components, either in a single batch or in a number of separate batches, and then passing the resulting dispersion through a filtration device such as a membrane filter if desired.

The white ink can be used as an aqueous inkjet ink for textile printing.

From the viewpoint of the ink storage stability, the pH of the white ink is preferably within a range from 7.0 to 10.0, and more preferably from 7.5 to 9.0.

The viscosity of the white ink may be adjusted as appropriate, and for example, from the viewpoint of the jetting characteristics, the viscosity at 23° C. is preferably within a range from 1 to 30 mPa·s.

<Color Ink>

A color ink for which the Young's modulus of the dried coating film is not more than 3.0 MPa can be used as the color ink.

Here, the dried coating film of the color ink means the dried coating film obtained by diluting the color ink with ion-exchanged water to achieve a total solid fraction amount of the pigment and the resin within the color ink of 20% by mass, pouring this dilute liquid into a PTFE (polytetrafluoroethylene) Petri dish in sufficient amount to achieve a dried film thickness of 0.4 mm, and then drying the coating film by heating in a thermostatic chamber at 70° C. for 60 minutes, at 120° C. for 20 minutes, and then at 160° C. for 10 minutes.

The Young's modulus of the dried coating film can be measured using a test piece obtained by cutting this dried coating film into the dumbbell No. 8 shape prescribed in JIS K6251. Specifically, using a TENSILON universal testing machine (RTG-1250 (a product name) manufactured by A&D Company, Ltd.), the stress-strain (elongation) curve of the test piece is measured under conditions including a tensile speed of 500 mm/min and a chuck separation of 20 mm. The stress at an elongation of 10% in the obtained stress-strain curve is deemed the Young's modulus [MPa] of the test piece. The film thickness of the dried coating film can be determined by actual measurement using a micrometer (MDH-25PX (a product name) manufactured by Mitutoyo Corporation).

The Young's modulus of the dried coating film of the color ink can be adjusted by adjusting the types and amounts of the components in the color ink. For example, the Young's modulus of the dried coating film can be adjusted by, for example, altering the Young's modulus of resins such as the water-dispersible resin in the color ink, the amount of resins such as the water-dispersible resin in the color ink, or the mass ratio between the pigment and the water-dispersible resin in the color ink. The Young's modulus of the dried coating film of the color ink may also be adjusted by using a combination of two or more of these methods.

The Young's modulus of the dried coating film of the color ink is preferably not more than 3.0 MPa, more preferably not more than 2.0 MPa, and even more preferably 1.0 MPa or less. The Young's modulus of the dried coating film of the color ink is preferably at least 0.1 MPa, and more preferably 0.3 MPa or greater. The Young's modulus of the dried coating film of the color ink is, for example, preferably within a range from 0.1 to 3.0 MPa, more preferably from 0.3 to 2.0 MPa, and even more preferably from 0.3 to 1.0 MPa.

Examples of the color ink include inks other than white ink, such as magenta ink, cyan ink, yellow ink and black ink.

The color ink preferably contains, for example, a colorant and a resin. Examples of the resin include the polymer dispersants and water-dispersible resins and the like described below.

The color ink may contain a pigment, a dye, or a combination thereof as the colorant, but preferably contains a pigment.

A non-white pigment is preferably included as the pigment.

Organic pigments such as azo pigments, phthalocyanine pigments, polycyclic pigments and dye lake pigments, and inorganic pigments such as carbon blacks and metal oxides may be used as the non-white pigment. Examples of the azo pigments include soluble azo lake pigments, insoluble azo pigments and condensed azo pigments. Examples of the phthalocyanine pigments include metal phthalocyanine pigments and metal-free phthalocyanine pigments. Examples of the polycyclic pigments include quinacridone-based pigments, perylene-based pigments, perinone-based pigments, isoindoline-based pigments, isoindolinone-based pigments, dioxazine-based pigments, thioindigo-based pigments, anthraquinone-based pigments, quinophthalone-based pigments, metal complex pigments and diketopyrrolopyrrole (DPP). Examples of the carbon blacks include furnace carbon black, lamp black, acetylene black and channel black. Examples of the metal oxides include titanium oxide and zinc oxide. Any one of these pigments may be used alone, or a combination of two or more pigments may be used.

From the viewpoints of the jetting stability and the storage stability, the average particle size of the pigment particles in the ink, expressed as the volume-based average value in a particle size distribution measured by a dynamic light scattering method, is preferably not more than 300 nm, more preferably not more than 150 nm, and even more preferably 100 nm or less.

A self-dispersing pigment may be used as the pigment. A self-dispersing pigment is a pigment in which a hydrophilic functional group has been introduced at the pigment surface by a chemical treatment or a physical treatment. The hydrophilic functional group introduced into the self-dispersing pigment is preferably a group that has ionicity, and by charging the pigment surface either anionically or cationically, the pigment particles can be stably dispersed in water by electrostatic repulsion. Preferred anionic functional groups include a sulfonate group, carboxyl group, carbonyl group, hydroxyl group, and phosphonate group. Preferred cationic functional groups include quaternary ammonium groups and quaternary phosphonium groups and the like.

These hydrophilic functional groups may be bonded directly to the pigment surface, or may be bonded via another atom grouping. Examples of this other atom grouping include, but are not limited to, alkylene groups, phenylene groups and a naphthylene groups. Examples of methods for treating the pigment surface include diazotization treatments, sulfonation treatments, hypochlorous acid treatments, humic acid treatments, and vacuum plasma treatments.

Examples of products that can be used favorably as self-dispersing pigments include the CAB-O-JET series of products such as CAB-O-JET 200, CAB-O-JET 300, CAB-O-JET 250C, CAB-O-JET 260M, CAB-O-JET 270 and CAB-O-JET 450C manufactured by Cabot Corporation, and BONJET BLACK CW-1, BONJET BLACK CW-2, BONJET BLACK CW-3 and BONJET BLACK CW-4 manufactured by Orient Chemical Industries, Ltd. (wherein all of the above are product names).

Microencapsulated pigments in which the pigment has been coated with a resin may also be used as the pigment.

Pigment dispersions containing a pigment that has already been dispersed using a pigment dispersant may also be used. Examples of commercially available products of pigment dispersions including a pigment dispersed using a pigment dispersant include the HOSTAJET series of products manufactured by Clariant AG, and the FUJI SP series of products manufactured by Fuji Pigment Co., Ltd. Pigment dispersions that have been dispersed using the pigment dispersants described below may also be used.

Examples of dyes that can be used favorably as the dye include water-soluble dyes and dyes that have been made water-soluble by reduction or the like, selected from among basic dyes, acid dyes, direct dyes, soluble vat dyes, acid mordant dyes, mordant dyes, reactive dyes, vat dyes and sulfide dyes. Further, dispersible dyes such as azo-based dyes, anthraquinone-based dyes, azomethine-based dyes and nitro-based dyes can also be used favorably. One of these dyes may be used alone, or a combination of a plurality of dyes may be used.

Either a single colorant or a combination of two or more colorants may be used.

From the viewpoints of the print density and the ink viscosity, the amount of the colorant relative to the total mass of the color ink is preferably within a range from 0.1 to 20% by mass, more preferably from 1 to 15% by mass, and even more preferably from 2 to 7% by mass. In those cases where two or more colorants are used, the above amount of the colorant refers to the total amount of all the colorants.

In those cases where a pigment is used as the colorant in the color ink, a pigment dispersant typified by polymer dispersants and surfactant-type dispersants and the like may be used to ensure stable dispersion of the pigment in the color ink.

Examples of the pigment dispersants include those described above in relation to the white ink, and the pigment dispersant may be selected from among those described above in relation to the white ink.

When used, there are no particular limitations on the blend amount of the pigment dispersant in the color ink, which varies depending on the type of pigment dispersant used, but generally, the amount of the pigment dispersant, expressed as a mass ratio of the active component relative to a value of 1 for the pigment (the pigment concentration), is preferably within a range from 0.005 to 0.5.

The color ink preferably contains water as an aqueous solvent, and the main solvent may be water.

There are no particular limitations on the water, but water containing as few ionic components as possible is preferred. In particular, from the viewpoint of the ink storage stability, the amount of polyvalent metal ions such as calcium ions is preferably kept low. Examples of the water include ion-exchanged water, distilled water and ultrapure water.

From the viewpoint of adjustment of the ink viscosity, the amount of water relative to the total mass of the color ink is preferably within a range from 20% by mass to 80% by mass, and more preferably from 30% by mass to 70% by mass.

The color ink may also contain a water-soluble organic solvent. Organic compounds that are liquid at room temperature and can be dissolved in water can be used as the water-soluble organic solvent, and the use of a water-soluble organic solvent that mixes uniformly with an equal volume of water at 1 atmosphere and 20° C. is preferred.

Examples of the water-soluble organic solvents that may be used include those described above in relation to the treatment liquid, and the water-soluble solvent may be selected from among those described above in relation to the treatment liquid.

One of these water-soluble organic solvents may be used alone, or a combination of two or more water-soluble organic solvents may be used provided the solvents form a single phase with water.

The amount of the water-soluble organic solvent in the color ink, relative to the total mass of the color ink, is preferably within a range from 5 to 50% by mass, and more preferably from 10 to 30% by mass. In those cases where two or more water-soluble organic solvents are used, the above amount of the water-soluble organic solvent refers to the total amount of all the water-soluble organic solvents.

The color ink preferably contains a surfactant.

Examples of surfactants that may be used include anionic surfactants, cationic surfactants, amphoteric surfactants and nonionic surfactants, but nonionic surfactants are particularly preferred. The surfactant may be, for example, a low-molecular weight surfactant or a polymer-based surfactant.

The HLB value of the surfactant is preferably within a range from 5 to 20, and more preferably from 10 to 18.

Examples of the surfactants that may be used include those described above in relation to the treatment liquid, and the surfactant may be selected from among those described above in relation to the treatment liquid. Among these, acetylene-based surfactants such as acetylene glycol-based surfactants can be used particularly favorably.

A single surfactant may be used, or a combination of two or more surfactants may be used.

The amount of the surfactant, relative to the total mass of the color ink, is preferably within a range from 0.1 to 10% by mass, and more preferably from 0.2 to 5% by mass. In those cases where two or more surfactants are used, the above amount of the surfactant refers to the total amount of all the surfactants.

The color ink may also contain a water-dispersible resin.

The water-dispersible resin is preferably composed of resin particles that can be dispersed in an aqueous solvent. The water-dispersible resin may, for example, be blended into the ink in the form of an oil-in-water resin emulsion.

The water-dispersible resin may be a self-emulsifying resin having an introduced hydrophilic component that enables stable dispersion in water, or may be a resin having a water-dispersibility through use of a separate emulsifier.

From the viewpoint of the inkjet jetting characteristics, the average particle size of the water-dispersible resin is preferably not more than 300 nm, more preferably not more than 200 nm, and even more preferably 150 nm or less. For example, the average particle size of the water-dispersible resin may be within a range from 10 nm to 300 nm. Here, the average particle size of the resin refers to the volume-based average particle size, and is a numerical value measured by a light scattering method.

In terms of the type of water-dispersible resin used, the use of a resin that forms a transparent coating film is preferred.

Examples of the water-dispersible resins that may be used include those described above in relation to the white ink, and the water-soluble resin may be selected from among those described above in relation to the white ink.

The water-dispersible resin may be anionic, cationic, nonionic, or amphoteric. An anionic water-dispersible resin is preferred as the water-dispersible resin.

The anionic water-dispersible resin may be a resin in which the anionic groups of the resin are located at the particle surface, as is the case with self-emulsifying resins, or may be a resin that has been subjected to a surface treatment by, for example, adhering an anionic dispersant to the resin particle surfaces. Representative examples of the anionic groups include carboxyl groups, sulfo groups, and phosphate groups. The anionic dispersant may, for example, be an anionic surfactant or the like.

One of these water-dispersible resins may be used alone, or a combination of two or more water-dispersible resins may be used. The amount (solid fraction) of the water-dispersible resin, relative to the total mass of the color ink, is preferably at least 1% by mass, more preferably at least 3% by mass, and even more preferably 5% by mass or greater. The amount (solid fraction) of the water-dispersible resin, relative to the total mass of the color ink, is preferably not more than 30% by mass, and more preferably 20% by mass or less. The amount (solid fraction) of the water-dispersible resin, relative to the total mass of the color ink, is preferably within a range from 1 to 30% by mass, more preferably from 3 to 30% by mass, and even more preferably from 5 to 20% by mass. In those cases where two or more water-dispersible resins are used, the above amount of the water-dispersible resin refers to the total amount of all the water-dispersible resins.

The color ink preferably contains a pigment and a water-dispersible resin.

In those cases where the color ink contains a pigment and a water-dispersible resin, there are no particular limitations on the ratio between the amounts of the pigment and the water-dispersible resin. From the viewpoint of effectively suppressing cracking of the ink image following laundering, the mass ratio of the water-dispersible resin relative to the pigment in the color ink (water-dispersible resin/pigment) is preferably 2.5 or greater. On the other hand, from the viewpoint of the jetting characteristics, the mass ratio of the water-dispersible resin relative to the pigment in the color ink (water-dispersible resin/pigment) is preferably not more than 5.0, and more preferably 4.0 or less. In the color ink, the mass ratio of the water-dispersible resin relative to the pigment (water-dispersible resin/pigment) is preferably within a range from 2.5 to 5.0, and more preferably from 2.5 to 4.0. In those cases where two or more water-dispersible resins are used, the amount of the water-dispersible resin in the above mass ratio of the water-dispersible resin relative to the pigment refers to the total amount of all the water-dispersible resins, and this also applies to the amount of the pigment.

The color ink preferably contains a crosslinking agent. When a crosslinking agent is included, the coating film of the color ink is strengthened, and cracking of the ink image following laundering tends to be more easily suppressed. Further, the image density of the color ink can be more easily increased.

Examples of the crosslinking agent include carbodiimide-based compounds, isocyanate-based compounds, and oxazoline-based compounds.

Examples of commercially available products of the carbodiimide-based compounds include CARBODILITE V-02 and the like manufactured by Nisshinbo Chemical Inc. Examples of commercially available products of the oxazoline-based compounds include EPOCROS K2030E and the like manufactured by Nippon Shokubai Co., Ltd. Examples of commercially available products of the isocyanate-based compounds include ELASTRON BN69 and the like manufactured by DKS Co., Ltd.

A single crosslinking agent may be used alone, or a combination of two or more crosslinking agents may be used. The amount of the crosslinking agent, relative to the total mass of the color ink, is preferably at least 0.1% by mass, and more preferably 0.2% by mass or greater. The amount of the crosslinking agent, relative to the total mass of the color ink, is preferably not more than 5% by mass, and more preferably 2% by mass or less. The amount of the crosslinking agent, relative to the total mass of the color ink, is preferably within a range from 0.1 to 5% by mass, and more preferably from 0.2 to 2% by mass. In those cases where two or more crosslinking agents are used, the above amount of the crosslinking agent refers to the total amount of all the crosslinking agents.

The color ink may also contain one or more of other components, if necessary. Examples of these other components include pH adjusters and preservatives.

There are no particular limitations on the method used for producing the color ink, and production may be performed using appropriate conventional methods. For example, the color ink may be obtained by using a stirring device such as a three-one motor to disperse all of the components, either in a single batch or in a number of separate batches, and then passing the resulting dispersion through a filtration device such as a membrane filter if desired.

The color ink can be used as an aqueous inkjet ink for textile printing.

From the viewpoint of the ink storage stability, the pH of the color ink is preferably within a range from 7.0 to 10.0, and more preferably from 7.5 to 9.0.

The viscosity of the color ink may be adjusted as appropriate, and for example, from the viewpoint of the jetting characteristics, the viscosity at 23° C. is preferably within a range from 1 to 30 mPa·s.

<Method for Producing Printed Textile Item>

The method for producing a printed textile item according to one embodiment includes applying the treatment liquid described above to a fabric using an inkjet method, applying the white ink described above, using an inkjet method and a wet-on-wet method, to the fabric to which the treatment liquid has been applied, and applying the color ink described above, using an inkjet method and a wet-on-wet method, to the fabric to which the white ink has been applied.

The treatment liquid, the white ink and the color ink are each preferably applied to the fabric using an inkjet method. An inkjet method is a printing method that can be conducted without substrate contact, in a simple and on-demand manner, and enables free image formation.

There are no particular limitations on the inkjet method, and any one of a piezo method, electrostatic method, or thermal method or the like may be used. When an inkjet printing device is used, liquid droplets of the treatment liquid or ink are preferably jetted from the inkjet head based on a digital signal, with the jetted ink droplets being adhered to the fabric.

The application of the treatment liquid to the fabric using an inkjet method is described below.

The region of the fabric to which the treatment liquid is applied may be a region of the same shape as the image that is to be formed by the white ink, may be a broader region that incorporates the shape of the image to be formed by the white ink, or may be the entire surface of the fabric.

The application region for the treatment liquid, the application region for the white ink and the application region for the color ink preferably overlap at least partially.

The application amount of the treatment liquid to the fabric is preferably within a range from 5 to 200 g/m², more preferably from 10 to 100 g/m², and even more preferably from 15 to 80 g/m².

Next, the application of the white ink, using an inkjet method and a wet-on-wet method, to the fabric to which the treatment liquid has been applied is described below.

The region of the fabric to which the white ink is applied may be a region of the same shape as the image that is to be formed by the color ink, may be a broader region that incorporates the shape of the image to be formed by the color ink, or may be the entire surface of the fabric.

The white ink is preferably applied so that the application region overlaps at least partially the application region for the treatment liquid. The application region for the treatment liquid, the application region for the white ink and the application region for the color ink preferably overlap at least partially.

The white ink is preferably applied using a wet-on-wet method to the fabric to which the treatment liquid has been applied. The white ink is preferably applied in a state where the moisture has not been completely removed from the fabric to which the treatment liquid has been applied. It is preferable that the white ink may be applied while the fabric to which the treatment liquid has been applied is maintained in a wet state. For example, following application of the treatment liquid to the fabric, the white ink is preferably applied without first conducting a drying step such as heated drying. The temperature of the fabric surface following application of the treatment liquid and up until the application of the white ink is preferably not more than 40° C., and is more preferably 35° C. or lower. Following application of the treatment liquid, it is preferable that the white ink is applied in a state where the residual amount of the volatile fraction of the treatment liquid on the fabric is still at least 90% by mass. The time period from the application of the treatment liquid to the fabric until the application of the white ink is preferably within a range from 0.1 to 200 seconds.

There are no particular limitations on the application amount of the white ink to the fabric, but the amount is, for example, preferably within a range from 80 to 400 g/m², and more preferably from 120 to 250 g/m².

The application of the color ink, using an inkjet method and a wet-on-wet method, to the fabric to which the white ink has been applied is described below.

The color ink is preferably applied so that the application region overlaps at least partially the application region for the white ink. The application region for the treatment liquid, the application region for the white ink and the application region for the color ink preferably overlap at least partially.

The color ink is preferably applied using a wet-on-wet method to the fabric to which the white ink has been applied. The color ink is preferably applied in a state where the moisture has not been completely removed from the fabric to which the white ink has been applied. It is preferable that the color ink may be applied while the fabric to which the white ink has been applied is maintained in a wet state. For example, following application of the white ink to the fabric, the color ink is preferably applied without first conducting a drying step such as heated drying. The temperature of the fabric surface following application of the white ink and up until the application of the color ink is preferably not more than 40° C., and is more preferably 35° C. or lower. Following application of the white ink, it is preferable that the color ink is applied in a state where the residual amount of the volatile fraction of the white ink on the fabric is still at least 90% by mass. The time period from the application of the white ink to the fabric until the application of the color ink is preferably within a range from 0.1 to 200 seconds.

There are no particular limitations on the application amount of the color ink to the fabric, but the amount is, for example, preferably within a range from 1 to 100 g/m², and more preferably from 5 to 50 g/m².

A single color ink may be applied, or two or more color inks may be applied.

The application of the treatment liquid, the application of the white ink, and the application of the color ink may be conducted using separate printing devices, or may be conducted using a single printing device. For example, two printing devices may be used, with the application of the treatment liquid conducted using one of the printing devices, and the application of the white ink and the application of the color ink conducted using the other printing device.

The method for producing a printed textile item preferably also includes subjecting the fabric to a heat treatment after the application of the color ink.

The heat treatment temperature may be selected appropriately in accordance with the material of the fabric and the like. The heat treatment temperature is, for example, preferably at least 100° C., and is more preferably 150° C. or higher. From the viewpoint of reducing any damage to the fabric, the heat treatment temperature is preferably not more than 200° C.

There are no particular limitations on the heating device, and for example, a heat press, roll heater, hot air device, or infrared lamp heater or the like may be used.

The heat treatment time may be selected appropriately in accordance with the heating method and the like, and is, for example, preferably within a range from 1 second to 10 minutes. The heat treatment time may be, for example, from 5 seconds to 5 minutes.

Applying of a post-treatment liquid following application of the color ink to the fabric may also be provided. Following the application of the color ink, heating the fabric may be provided, followed by the application of a post-treatment liquid. The post-treatment liquid may also be applied using a wet-on-wet method following the application of the color ink. The heating of the fabric may also be provided after the application of the post-treatment liquid.

<Ink Set>

One embodiment provides an ink set for inkjet textile printing that includes a treatment liquid containing an aggregating agent, a white ink having a charge density of at least 30 μeq/g, and a color ink for which the Young's modulus of the dried coating film is not more than 3.0 MPa.

The treatment liquid, the white ink and the color ink described above for use in the above method for producing a printed textile item may be used as the treatment liquid, the white ink and the color ink respectively.

The ink set for inkjet textile printing may also include a post-treatment liquid or the like.

Examples

The present invention is described below in further detail using a series of examples, but the present invention is in no way limited by the following examples.

<Production of Treatment Liquid>

The formulation of a treatment liquid U-1 is shown in Table 1. The raw materials shown in Table 1 were mixed in the blend proportions shown in Table 1, and any coarse particles were removed with a membrane filter having a pore size of 3 μm, thus obtaining the treatment liquid U-1.

TABLE 1

| Treatment liquid formulation | | | |
|---|---|---|---|
| Raw materials (% by mass) | | Active component (% by mass) | Treatment liquid U-1 |
| Aggregating agent | Calcium chloride | 100 | 20.0 |
| Water-soluble organic solvent | 1,4-butanediol | | 25.0 |
| Surfactant | OLFINE E1010 | | 0.5 |
| Water | Ion-exchanged water | | 54.5 |
| Total (% by mass) | | | 100.0 |
| Charge density (μeq/g) | | | 36 |

Details of the raw materials listed in Table 1 are shown below.

(Aggregating Agent)

Calcium chloride: manufactured by FUJIFILM Wako Pure Chemical Corporation, active component: 100% by mass (Water-Soluble Organic Solvent)

1,4-butanediol: manufactured by FUJIFILM Wako Pure Chemical Corporation (Surfactant)

OLFINE E1010: an acetylene-based surfactant, manufactured by Nissin Chemical Industry Co., Ltd., active component: 100% by mass <Production of White Inks>

The formulations of white inks W-1 to W-8 are shown in Tables 2 and 3. The blend proportions for the raw materials in Tables 2 and 3 are those including any solvents or the like which may be incorporated within the materials.

The materials shown in Tables 2 and 3 were mixed in accordance with the blend proportions shown in Tables 2 and 3, and any coarse particles were removed with a membrane filter having a pore size of 3 μm, thus obtaining a series of white inks.

Details of the raw materials listed in Tables 2 and 3 are shown below.

(Pigment Dispersion)

White pigment dispersion: obtained using the method described below, pigment fraction: 40% by mass (Water-Dispersible Resins)

DAOTAN TW6490/35WA: a water-dispersible polyurethane resin (aqueous resin emulsion), manufactured by Daicel-Allnex Ltd., solid fraction: 35% by mass DAOTAN TW6460/35WA: a water-dispersible polyurethane resin (aqueous resin emulsion), manufactured by Daicel-Allnex Ltd., solid fraction: 35% by mass DAOTAN TW6450/30WA: a water-dispersible polyurethane resin (aqueous resin emulsion), manufactured by Daicel-Allnex Ltd., solid fraction: 30% by mass

TABLE 2

White ink formulations

| Raw materials (% by mass) | | Solid fraction (% by mass) | Charge density (μeq/g) | White ink W-1 | White ink W-2 | White ink W-3 | White ink W-4 |
|---|---|---|---|---|---|---|---|
| White pigment dispersion | | 40 | 21 | 25.0 | 25.0 | 25.0 | 25.0 |
| Water-dispersible resins | DAOTAN TW6490/35WA | 35 | 48 | 42.9 | | | |
| | DAOTAN TW6460/35WA | 35 | 57 | | 28.6 | | |
| | DAOTAN TW6450/30WA | 30 | 84 | | | 33.3 | |
| | NeoRez R986 | 25 | 231 | | | | 60.0 |
| | Mowinyl 6763 | 35 | 33 | | | | |
| Water-soluble organic solvent | 1,4-butanediol | | | 20.0 | 20.0 | 20.0 | 10.0 |
| Surfactant | OLFINE E1010 | | | 0.5 | 0.5 | 0.5 | 0.5 |
| Water | Ion-exchanged water | | | 11.6 | 25.9 | 21.2 | 4.5 |
| | Total (% by mass) | | | 100.0 | 100.0 | 100.0 | 100.0 |
| | Charge density (μeq/g) | | | 36 | 43 | 55 | 101 |

TABLE 3

White ink formulations

| Raw materials (% by mass) | | Solid fraction (% by mass) | Charge density (μeq/g) | White ink W-5 | White ink W-6 | White ink W-7 | White ink W-8 |
|---|---|---|---|---|---|---|---|
| White pigment dispersion | | 40 | 21 | 25.0 | 25.0 | 25.0 | 25.0 |
| Water-dispersible resins | DAOTAN TW6490/35WA | 35 | 48 | 35.7 | 25.7 | 25.7 | |
| | DAOTAN TW6460/35WA | 35 | 57 | | | | |
| | DAOTAN TW6450/30WA | 30 | 84 | | | 30.0 | |
| | NeoRez R986 | 25 | 231 | 10.0 | 35.0 | | |
| | Mowinyl 6763 | 35 | 33 | | | | 37.7 |
| Water-soluble organic solvent | 1,4-butanediol | | | 20.0 | 10.0 | 10.0 | 20.0 |
| Surfactant | OLFINE E1010 | | | 0.5 | 0.5 | 0.7 | 0.5 |
| Water | Ion-exchanged water | | | 8.8 | 3.8 | 8.6 | 16.8 |
| | Total (% by mass) | | | 100.0 | 100.0 | 100.0 | 100.0 |
| | Charge density (μeq/g) | | | 41 | 55 | 48 | 21 |

NeoRez R986: a water-dispersible polyurethane resin (aqueous resin emulsion), manufactured by Covestro AG, solid fraction: 25% by mass Mowinyl 6763: a water-dispersible polyurethane resin (aqueous resin emulsion), manufactured by Japan Coating Resin Corporation, solid fraction: 35% by mass (Water-Soluble Organic Solvent)

1,4-butanediol: manufactured by FUJIFILM Wako Pure Chemical Corporation (Surfactant)

OLFINE E1010: an acetylene-based surfactant, manufactured by Nissin Chemical Industry Co., Ltd., active component: 100% by mass <Production of White Pigment Dispersion>

First, 400 g of titanium oxide R-21N (manufactured by Sakai Chemical Industry Co., Ltd.) as a white pigment, and 20 g (active component: 5 g) of DEMOL EP (manufactured by Kao Corporation) as a pigment dispersant were mixed with 580 g of ion-exchanged water, and a beads mill (DYNO-MILL KDL model A, manufactured by Shinmaru Enterprises Corporation) containing 0.5 mmø zirconia beads at a fill ratio of 80% was used to disperse the mixture under conditions including a residence time of 5 minutes, thus obtaining a white pigment dispersion (pigment fraction: 40% by mass).

<Production of Color Inks>

The formulations of color inks K-1 to K-12 are shown in Tables 4 and 5. The blend proportions for the raw materials in the tables are those including any solvents or the like which may be incorporated within the materials.

The materials shown in Tables 4 and 5 were mixed in accordance with the blend proportions shown in Tables 4 and 5, and any coarse particles were removed with a membrane filter having a pore size of 3 μm, thus obtaining a series of color inks.

TABLE 4

Color ink formulations

| Raw materials (% by mass) | | Solid fraction (% by mass) | Color ink K-1 | Color ink K-2 | Color ink K-3 | Color ink K-4 | Color ink K-5 | Color ink K-6 |
|---|---|---|---|---|---|---|---|---|
| Black pigment dispersion | | 20 | 25.0 | 25.0 | 25.0 | 25.0 | 25.0 | 25.0 |
| Water-dispersible resins | SUPERFLEX 460 | 38 | 35.5 | | | 26.3 | 26.3 | 26.3 |
| | UW-1005D-C1 | 30 | | 45.0 | | 26.7 | | |
| | UW-1527DF | 30 | | | 45.0 | | 26.7 | |
| | ADEKA BONTIGHTER HUX-370 | 33 | | | | | | 24.2 |
| Cross-linking agents | CARBODILITE V-02 | 40 | | | | | | |
| | ELASTRON BN69 | 40 | | | | | | |
| | EPOCROS K2030E | 40 | | | | | | |
| Surfactant | OLFINE E1010 | | 0.5 | 0.5 | 0.5 | 0.5 | 0.5 | 0.5 |
| Water-soluble organic solvent | 1,4-butanediol | | 20.0 | 20.0 | 20.0 | 20.0 | 20.0 | 20.0 |
| Water | Ion-exchanged water | | 19.0 | 9.5 | 9.5 | 1.5 | 1.5 | 4.0 |
| Total (% by mass) | | | 100.0 | 100.0 | 100.0 | 100.0 | 100.0 | 100.0 |
| Young's modulus of dried coating film (MPa) | | | 0.27 | 1.30 | 1.91 | 0.56 | 1.02 | 2.56 |

TABLE 5

Color ink formulations

| Raw materials (% by mass) | | Solid fraction (% by mass) | Color ink K-7 | Color ink K-8 | Color ink K-9 | Color ink K-10 | Color ink K-11 | Color ink K-12 |
|---|---|---|---|---|---|---|---|---|
| Black pigment dispersion | | 20 | 25.0 | 25.0 | 25.0 | 25.0 | 25.0 | 25.0 |
| Water-dispersible resins | SUPERFLEX 460 | 38 | 26.3 | 63.2 | 35.5 | 35.5 | 35.5 | |
| | UW-1005D-C1 | 30 | | | | | | |
| | UW-1527DF | 30 | | | | | | |
| | ADEKA BONTIGHTER HUX-370 | 33 | | | | | | 37.9 |

TABLE 5-continued

Color ink formulations

| Raw materials (% by mass) | | Solid fraction (% by mass) | Color ink K-7 | Color ink K-8 | Color ink K-9 | Color ink K-10 | Color ink K-11 | Color ink K-12 |
|---|---|---|---|---|---|---|---|---|
| Cross-linking agents | CARBODILITE V-02 | 40 | | | 1.3 | | | |
| | ELASTRON BN69 | 40 | | | | 1.3 | | |
| | EPOCROS K2030E | 40 | | | | | 1.3 | |
| Surfactant | OLFINE E1010 | | 0.5 | 0.5 | 0.5 | 0.5 | 0.5 | 0.5 |
| Water-soluble organic solvent | 1,4-butanediol | | 20.0 | 10.0 | 20.0 | 20.0 | 20.0 | 20.0 |
| Water | Ion-exchanged water | | 28.2 | 1.3 | 17.7 | 17.7 | 17.7 | 16.6 |
| | Total (% by mass) | | 100.0 | 100.0 | 100.0 | 100.0 | 100.0 | 100.0 |
| | Young's modulus of dried coating film (MPa) | | 0.66 | 0.51 | 0.68 | 0.71 | 0.88 | 4.95 |

Details of the raw materials listed in Tables 4 and 5 are shown below.
(Pigment Dispersion)
Black pigment dispersion: obtained using the method described below, pigment fraction: 20% by mass
(Water-Dispersible Resins)
SUPERFLEX 460: a water-dispersible polyurethane resin (aqueous resin emulsion), manufactured by DKS Co., Ltd., solid fraction: 38% by mass
UW-1005D-C1: a water-dispersible polyurethane resin (aqueous resin emulsion), manufactured by UBE Corporation, solid fraction: 30% by mass
UW-1527DF: a water-dispersible polyurethane resin (aqueous resin emulsion), manufactured by UBE Corporation, solid fraction: 30% by mass
ADEKA BONTIGHTER HUX-370: a water-dispersible acrylic-based resin (aqueous resin emulsion), manufactured by ADEKA Corporation, solid fraction: 33% by mass
(Crosslinking Agents)
CARBODILITE V-02: a carbodiimide-based compound, manufactured by Nisshinbo Chemical Inc., solid fraction: 40% by mass
ELASTRON BN69: an isocyanate-based compound, manufactured by DKS Co., Ltd., solid fraction: 40% by mass
EPOCROS 2030E: an oxazoline-based compound, manufactured by Nippon Shokubai Co., Ltd., solid fraction: 40% by mass
(Surfactant)
OLFINE E1010: an acetylene-based surfactant, manufactured by Nissin Chemical Industry Co., Ltd., active component: 100% by mass
(Water-Soluble Organic Solvent)
1,4-butanediol: manufactured by FUJIFILM Wako Pure Chemical Corporation
<Production of Black Pigment Dispersion>
First, 200 g of #960 (manufactured by Mitsubishi Chemical Corporation) as a black pigment, and 50 g of DIS-PERBYK-102 (a polymer dispersant, manufactured by BYK-Chemie Japan K.K.) as a pigment dispersant were mixed with 800 g of ion-exchanged water, and a beads mill (DYNO-MILL KDL model A, manufactured by Shinmaru Enterprises Corporation) containing 0.5 mmø zirconia beads at a fill ratio of 60% was used to disperse the mixture under conditions including a residence time of 2 minutes, thus obtaining a black pigment dispersion (pigment fraction: 20% by mass).
<Method for Measuring Charge Density>
The charge density of the treatment liquid U-1 in Table 1, the charge density of each of the white inks in Tables 2 and 3, and the charge densities of the water-dispersible resins used in the white inks of Tables 2 and 3 represent charge densities measured by the flow potential method, and were measured in the manner described below. A colloid particle charge meter ("Model CAS" manufactured by AFG Analytic GmbH) was used as the charge density measurement device.
(Charge Density of Treatment Liquid and Charge Densities of White Inks)
Each of the white inks and the treatment liquid that were to be measured was diluted 100-fold with ion-exchanged water to form a sample, a titration was conducted using the titration solution described below, the reaction end point where the flow potential reached 0 V was measured, and the total amount of charge for the dilute treatment liquid and the total amount of charge for each of the dilute white inks was determined from the amount of the titration solution used in reaching this reaction end point. The charge density (μeq/g) for each white ink was determined from the total amount of charge for the white ink per unit of mass of the active component in the dilute white ink. In a similar manner, the charge density (μeq/g) of the treatment liquid was determined from the total amount of charge for the treatment liquid per unit of mass of the active component in the dilute treatment liquid. A 0.0025 N poly(diallyldimethylammonium chloride) (polyDADMAC) solution (manufactured by FUJIFILM Wako Pure Chemical Corporation) was used as the titration solution for the white inks, and a 0.0025 N potassium polyvinyl sulfate (PVSK) solution (manufactured by FUJIFILM Wako Pure Chemical Corporation) was used as the titration solution for the treatment liquid.
(Charge Densities of Water-Dispersible Resins Used in White Inks)
The aqueous resin emulsion of each of the water-dispersible resins to be measured was diluted with water to achieve a solid fraction of 0.05% by mass, and using the thus obtained dilute liquid as a sample, a titration was conducted with a 0.0025 N poly(diallyldimethylammonium chloride) (polyDADMAC) solution (manufactured by FUJIFILM Wako Pure Chemical Corporation), the reaction end point where the flow potential of the dilute liquid reached 0 V was measured, and the total amount of charge for the dilute liquid was determined from the amount of the polyDADMAC solution used in reaching this reaction end point. The value obtained by dividing this total amount of charge for the dilute treatment liquid by the amount of the solid fraction contained in the dilute liquid represents the charge density (μeq/g) of the water-dispersible resin.

<Young's Modulus of Dried Coating Film of Color Ink>

The Young's modulus of the dried coating film of each of the color inks in Tables 4 and 5 represents a value obtained in the following manner. Namely, the color ink was diluted with ion-exchanged water so as to achieve a total solid fraction amount for the pigment and resin within the ink of 20% by mass, and this dilute liquid was poured into a PTFE (polytetrafluoroethylene) Petri dish in sufficient amount to achieve a dried film thickness of 0.4 mm, and was then dried by heating in a thermostatic chamber at 70° C. for 60 minutes, at 120° C. for 20 minutes, and then at 160° C. for 10 minutes, thus obtaining a dried coating film of the ink. The thus obtained dried coating film was cut into a dumbbell No. 8 shape prescribed in JIS K6251 to prepare a test piece. Using a TENSILON universal testing machine (RTG-1250, manufactured by A&D Co., Ltd.), the stress-strain (elongation) curve of the test piece was then measured under conditions including a tensile speed of 500 mm/min and a chuck separation of 20 mm. The stress at an elongation of 10% in the obtained stress-strain curve was deemed the Young's modulus [MPa] of the test piece. The film thickness of the dried coating film was determined by actual measurement using a micrometer (MDH-25M, manufactured by Mitutoyo Corporation).

<Production of Printed Textile Items>

The treatment liquid, white inks and color inks used in the printed textile items of Examples 1 to 17 and Comparative Examples 1 and 2 are shown in Tables 6 and 7.

In Examples 1 to 17 and Comparative Examples 1 and 2, black 100% cotton T-shirts "Printstar 085-cvt" (manufactured by Toms Co., Ltd.) were used as substrates.

Further, two inkjet printers (textile printers MMP-8130 manufactured by Mastermind Inc.) were prepared, the treatment liquid was loaded into the first printer (hereafter sometimes referred to as "printer 1"), and the white ink and color ink were loaded into the second printer (hereafter sometimes referred to as "printer 2").

Printed textile items of Examples 1 to 17 and Comparative Examples 1 and 2 were then produced by executing steps 1 to 4 described below.

Step 1

In step 1, using the printer 1 loaded with the treatment liquid, the treatment liquid was applied to the substrate across an entire region of 100 mm×200 mm in sufficient amount to achieve an application amount for the treatment liquid of 50 g/m².

Step 2

In step 2, using the printer 2, a wet-on-wet method was used to apply the white ink to the substrate to which the treatment liquid had been applied. In step 2, a white solid image of 100 mm×200 mm was printed onto the 100 mm×200 mm region coated with the treatment liquid, using an application amount for the white ink of 200 g/m².

Step 3

In step 3, using the printer 2, a wet-on-wet method was used to apply the color ink to the substrate to which the white ink had been applied. In this step, a black solid image of 100 mm×200 mm was printed onto the 100 mm×200 mm region coated with the treatment liquid and the white ink, namely onto the white solid image of 100 mm×200 mm, using an application amount for the color ink of 20 g/m².

Step 4

In step 4, the printed T-shirt was subjected to a heat treatment at 160° C. for 120 seconds using a Hotronix Fusion Heat Press (manufactured by Stahls Hotronix Inc.).

<Evaluations>

The evaluations described below were conducted. The evaluation of the "image density of the color ink" and the evaluation of "cracking of the ink image following laundering" described below were conducted using printed textile items obtained by performing steps 1 to 4. The evaluation of the "concealment properties due to the white ink" described below was conducted using a white coating film obtained by performing the heat treatment of step 4 directly after step 2 without performing step 3.

The results are shown in Tables 6 and 7.

(Concealment Properties Due to White Ink)

The L* value of the white solid image obtained in step 2 was measured using an X-Rite eXact spectral colorimeter, and the measured value was evaluated against the following evaluation criteria.

A: 90≤L*
B: 85≤L*<90
D: L*<85

(Image Density of Color Ink)

The OD value of the obtained printed textile item was measured using an X-Rite eXact spectral colorimeter, and the measured value was evaluated against the following evaluation criteria.

A: 1.00≤OD
B: 0.85≤OD<1.00
C: 0.75≤OD<0.85
D: OD<0.75

(Cracking of Ink Image Following Laundering)

Each of the obtained printed textile items was cut to dimensions of 25 mm×40 mm to form a test piece. The test piece, 10 mmø stainless steel balls and a laundering solution (an aqueous solution containing 0.1% by mass of a synthetic laundering detergent) that had been heated to 50° C. were placed in a container with a capacity of 50 mL, and a high-speed ball mill mixer (Rocking Mill) was used to agitate the mixture at an oscillation frequency of 60 Hz for 10 minutes. Following this agitation, the test piece was dried in an atmosphere at 23° C. for three hours, and the ink image was then inspected visually for cracking, with an evaluation made against the following evaluation criteria.

A: no cracking visible
B: some minor cracking
D: marked cracking

TABLE 6

|  | Examples | | | | | | | | | |
| --- | --- | --- | --- | --- | --- | --- | --- | --- | --- | --- |
|  | 1 | 2 | 3 | 4 | 5 | 6 | 7 | 8 | 9 | 10 |
| Treatment liquid | U-1 | U-1 | U-1 | U-1 | U-1 | U-1 | U-1 | U-1 | U-1 | U-1 |
| Color ink | K-1 | K-2 | K-3 | K-4 | K-5 | K-6 | K-1 | K-1 | K-1 | K-1 |
| White ink | W-1 | W-1 | W-1 | W-7 | W-7 | W-7 | W-2 | W-3 | W-4 | W-5 |

TABLE 6-continued

|  |  | Examples | | | | | | | | | |
|---|---|---|---|---|---|---|---|---|---|---|---|
|  |  | 1 | 2 | 3 | 4 | 5 | 6 | 7 | 8 | 9 | 10 |
| Color ink | Young's modulus of dried coating film (MPa) | 0.27 | 1.30 | 1.91 | 0.56 | 1.02 | 2.56 | 0.27 | 0.27 | 0.27 | 0.27 |
|  | Water-dispersible resin/pigment (mass ratio) | 2.7 | 2.7 | 2.7 | 3.6 | 3.6 | 3.6 | 2.7 | 2.7 | 2.7 | 2.7 |
|  | Crosslinking agent | none | none | none | none | none | none | none | none | none | none |
| White ink | Charge density ($\mu eq/g$) | 36 | 36 | 36 | 48 | 48 | 48 | 43 | 55 | 101 | 41 |
|  | Charge density of water-dispersible resin A ($\mu eq/g$) | 48 | 48 | 48 | 48 | 48 | 48 | 57 | 84 | 231 | 48 |
|  | Charge density of water-dispersible resin B ($\mu eq/g$) | — | — | — | 84 | 84 | 84 | — | — | — | 231 |
|  | Concealment properties of white ink | B | B | B | B | B | B | B | A | A | A |
|  | Image density of color ink | C | C | C | C | C | C | C | C | C | B |
|  | Cracking of ink image following laundering | A | A | A | A | A | A | A | B | B | A |

TABLE 7

|  |  | Examples | | | | | | | Comparative Examples | |
|---|---|---|---|---|---|---|---|---|---|---|
|  |  | 11 | 12 | 13 | 14 | 15 | 16 | 17 | 1 | 2 |
|  | Treatment liquid | U-1 | U-1 | U-1 | U-1 | U-1 | U-1 | U-1 | U-1 | U-1 |
|  | Color ink | K-1 | K-1 | K-7 | K-8 | K-9 | K-10 | K-11 | K-12 | K-8 |
|  | White ink | W-6 | W-7 | W-7 | W-7 | W-7 | W-7 | W-7 | W-7 | W-8 |
| Color ink | Young's modulus of dried coating film (MPa) | 0.27 | 0.27 | 0.66 | 0.51 | 0.68 | 0.71 | 0.88 | 4.95 | 0.51 |
|  | Water-dispersible resin/pigment (mass ratio) | 2.7 | 2.7 | 2.0 | 4.8 | 2.7 | 2.7 | 2.7 | 2.5 | 4.8 |
|  | Crosslinking agent | none | none | none | none | yes | yes | yes | none | none |
| White ink | Charge density ($\mu eq/g$) | 55 | 48 | 48 | 48 | 48 | 48 | 48 | 48 | 21 |
|  | Charge density of water-dispersible resin A ($\mu eq/g$) | 48 | 48 | 48 | 48 | 48 | 48 | 48 | 48 | 33 |
|  | Charge density of water-dispersible resin B ($\mu eq/g$) | 231 | 84 | 84 | 84 | 84 | 84 | 84 | 84 | — |
|  | Concealment properties of white ink | A | A | A | A | A | A | A | A | D |
|  | Image density of color ink | B | B | B | B | A | A | A | B | D |
|  | Cracking of ink image following laundering | A | A | B | A | A | A | A | D | B |

As shown in the above tables, Examples 1 to 17 exhibited excellent concealment properties due to the white ink, and excellent results were also obtained for the evaluation of the image density of the color ink and the evaluation of cracking of the ink image following laundering.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method for producing a printed textile item, the method comprising:

applying a treatment liquid comprising an aggregating agent to a fabric by an inkjet method, applying a white ink having a charge density in a range of at least 30 $\mu eq/g$, by an inkjet method and a wet-on-wet method, to the fabric to which the treatment liquid has been applied, and applying a color ink for which a Young's modulus of a dried coating film is not more than 0.88 MPa, by an inkjet method and a wet-on-wet method, to the fabric to which the white ink has been applied.

2. The method for producing a printed textile item according to claim 1, wherein the color ink comprises a pigment and a water-dispersible resin, and a mass ratio of the water-dispersible resin relative to the pigment (water-dispersible resin/pigment) is within a range from 2.5 to 5.0.

3. The method for producing a printed textile item according to claim 1, wherein the color ink comprises a crosslinking agent.

4. The method for producing a printed textile item according to claim 2, wherein the color ink comprises a crosslinking agent.

5. The method for producing a printed textile item according to claim 1, wherein the white ink comprises: a water-dispersible resin A having a charge density in a range of not more than 55 μeq/g, and a water-dispersible resin B having a charge density in a range of 75 μeq/g or higher.

6. The method for producing a printed textile item according to claim 2, wherein the white ink comprises: a water-dispersible resin A having a charge density in a range of not more than 55 μeq/g, and a water-dispersible resin B having a charge density in a range of 75 μeq/g or higher.

7. The method for producing a printed textile item according to claim 3, wherein the white ink comprises: a water-dispersible resin A having a charge density in a range of not more than 55 μeq/g, and a water-dispersible resin B having a charge density in a range of 75 μeq/g or higher.

* * * * *